United States Patent [19]

Wu

[11] Patent Number: 5,197,748
[45] Date of Patent: Mar. 30, 1993

[54] HYDRAULIC CHUCK ASSEMBLY

[76] Inventor: Shui-Lai Wu, No. 83-18, Lane 162, Chen-Hsing Rd., Taichung City, Taiwan

[21] Appl. No.: 802,272

[22] Filed: Dec. 4, 1991

[51] Int. Cl.⁵ .................... B23B 31/177; B23B 31/30
[52] U.S. Cl. .................................... 279/4.12; 279/121
[58] Field of Search .................. 279/4.01, 4.1, 4.12, 279/121

[56] References Cited

U.S. PATENT DOCUMENTS 2,954,983  10/1960  Roby ............................ 279/121
4,026,566   5/1977  Röhm .......................... 279/121

Primary Examiner—Steven C. Bishop
Attorney, Agent, or Firm—Jacobson, Price, Holman & Stern

[57] ABSTRACT

A hydraulic chuck assembly is to be provided on one end of a shaft of a CNC lathe and includes a hollow main chuck body having a front head being formed with a plurality of radially extending and angularly spaced seat retaining slide grooves. A tubular plunger is movably provided inside the main chuck body. The plunger has a rear end portion and a gradually expanding and forwardly extending funnel-shaped cam portion extending into the front head. A plurality of grip seats are slidably retained in the slide grooves. Each of the grip seats has a rear side formed with an inclining groove. The inclining grooves of the grip seats cooperatively receive the funnel-shaped cam portion. The plunger is movable forward or rearward, and the funnel-shaped cam portion cams the inclining grooves of the grip seats so as to move the grip seats toward or away from each other along the slide grooves.

4 Claims, 10 Drawing Sheets

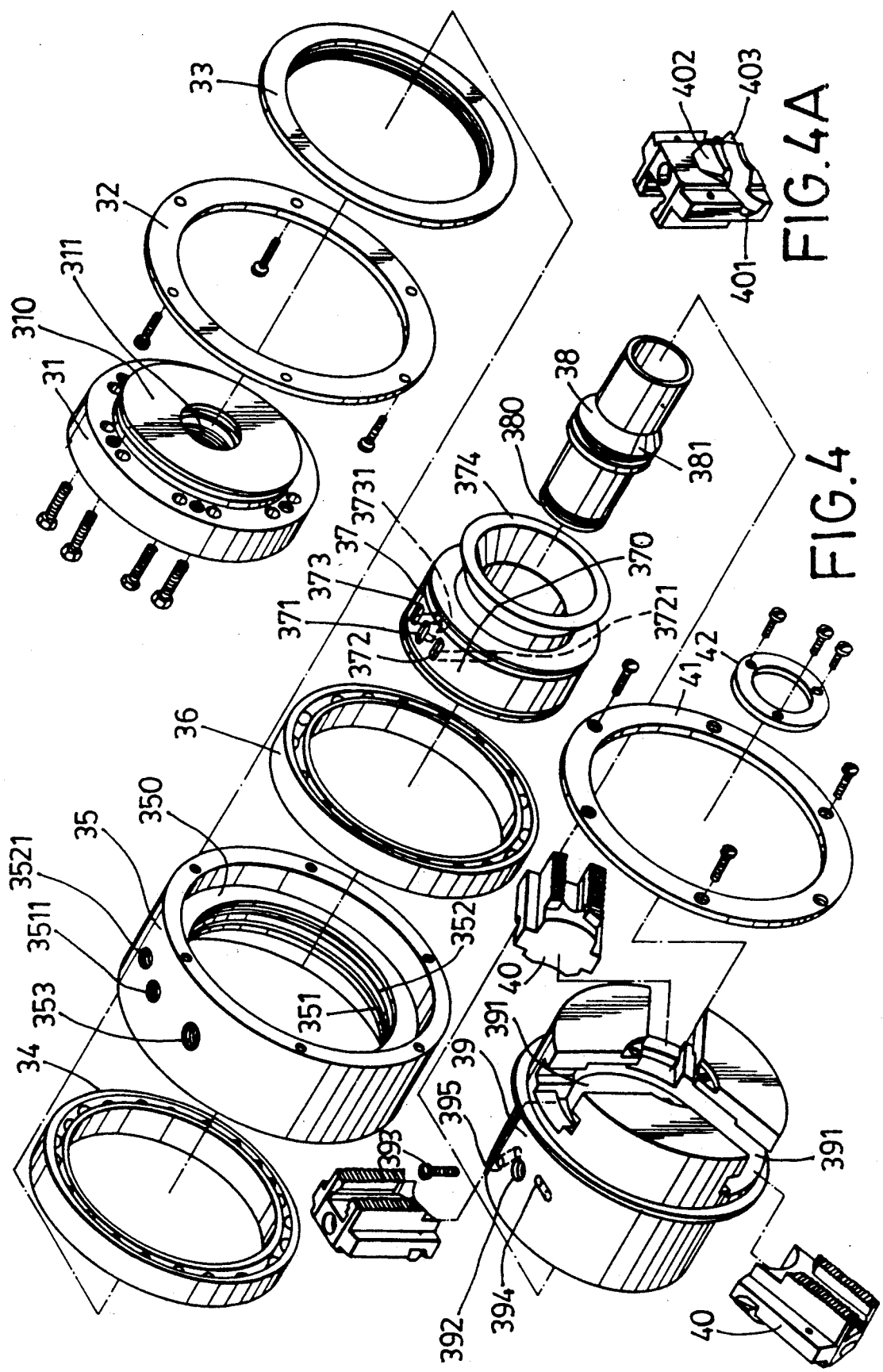

HYDRAULIC CHUCK ASSEMBLY

BACKGROUND OF THE INVENTION

1. Field of the Invention This invention relates to a hydraulic chuck assembly, more particularly to a hydraulic chuck assembly which is to be provided on one end of a shaft of a CNC lathe and which is more durable and which has a stronger gripping effect than the prior art.

2. Description of the Related Art Referring to FIGS. 1, 2 and 3, the hydraulic chuck assembly (2) of a conventional CNC lathe is shown to comprise a main chuck body (21) and a plurality of grip seats (22). The bottom end of each grip seat (22) is provided with a tapered slide piece (221). The main chuck body (21) has a plurality of angularly spaced and axially extending inclined slide grooves (211) so as to movably receive the grip seats (22). The hydraulic chuck assembly (2) is provided on one end of a lathe axle means (23). A rotary actuating shaft (24) is controlled by a hydraulic fluid system (25) so as to move the main chuck body (21) axially forward or rearward, thus correspondingly moving the grip seats (22) away from or toward one another. Each of the grip seats (22) is to be provided with a grip member (not shown). The grip members can cooperatively hold a tool when the grip seats (22) are moved toward one another.

The main drawback of the above disclosed hydraulic chuck (2) is that the grip seats (22) are mounted on the main chuck body (21) at the axially extending slide grooves (211). The main chuck body (21) easily breaks at the slide grooves (211) when the tool held by the hydraulic chuck assembly (2) is relatively heavy or when the rotating speed is relatively fast. This can cause damage to the workpiece and to other parts of the lathe and can cause injury to the operator.

SUMMARY OF THE INVENTION

Therefore, the objective of the present invention is to provide an improved hydraulic chuck assembly which is to be provided on one end of a shaft of a CNC lathe and which is more durable and which has a stronger gripping effect than the prior art.

Accordingly, the preferred embodiment of a hydraulic chuck assembly of the present invention is to be provided on one end of a shaft of a lathe and comprises: a hollow main chuck body having a front head being formed with a plurality of radially extending and angularly spaced seat retaining slide grooves; a tubular plunger movably provided inside the main chuck gradually expanding and forwardly extending funnel-shaped cam portion extending into the front head; and a plurality of grip seats each being slidably retained in a respective one of the slide grooves, each of the grip seats having a rear side formed with an inclining groove, said inclining grooves of the grip seats cooperatively receiving the funnel-shaped cam portion, said plunger being movable forward or rearward, and said funnel-shaped cam portion camming the inclining grooves of the grip seats so as to move the grip seats toward or away from each other along the slide grooves.

BRIEF DESCRIPTION OF THE DRAWINGS

Other features and advantages of the present invention will become apparent in the following detailed description of the preferred embodiments with reference to the accompanying drawings, of which:

FIG. 4 is an exploded view of the first preferred embodiment of a hydraulic chuck assembly according to present invention;

FIG. 4A is a perspective view illustrating the rear side of a grip seat of the preferred embodiment;

DETAILED DESCRIPTION OF THE PREFERRED EMBODIMENTS

Figure 1:
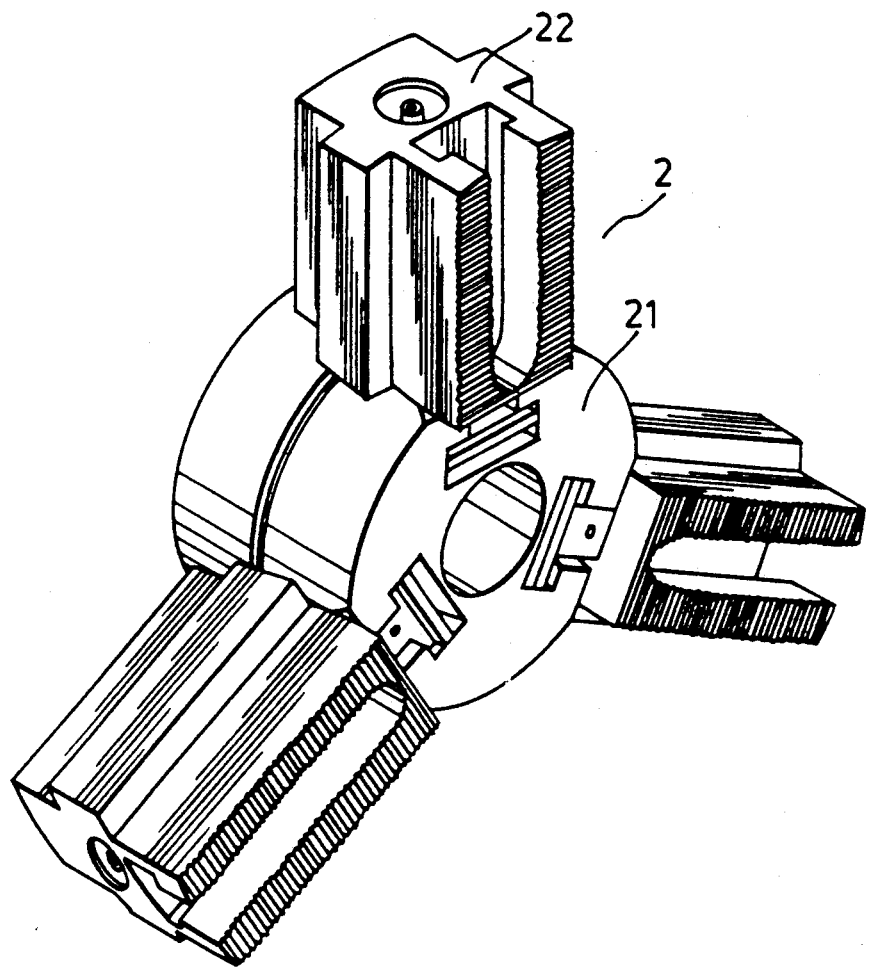
FIG. 1 in an illustration of a conventional hydraulic chuck assembly.
Figure 2:
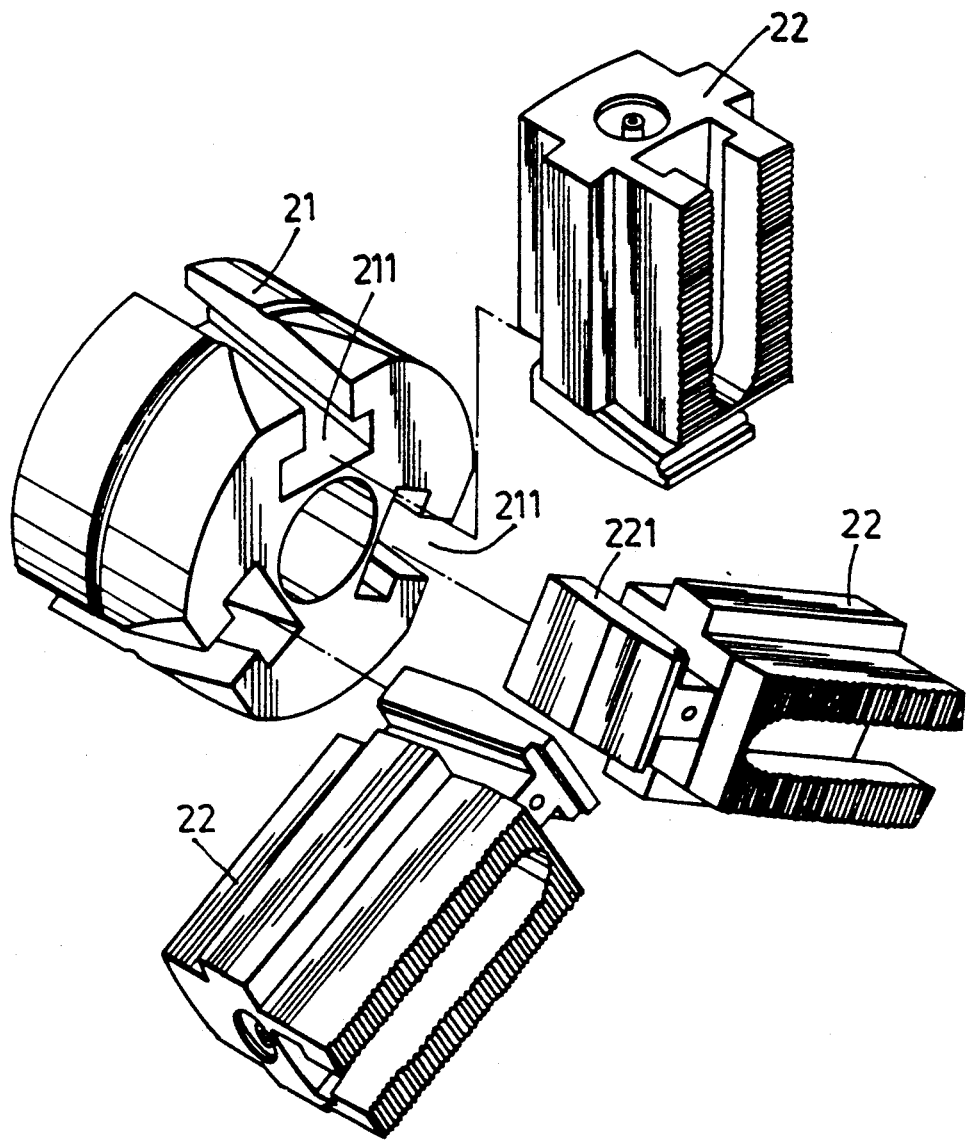
FIG. 2 is a fragmentary exploded view of the conventional hydraulic chuck assembly shown in FIG. 1.
Figure 3:
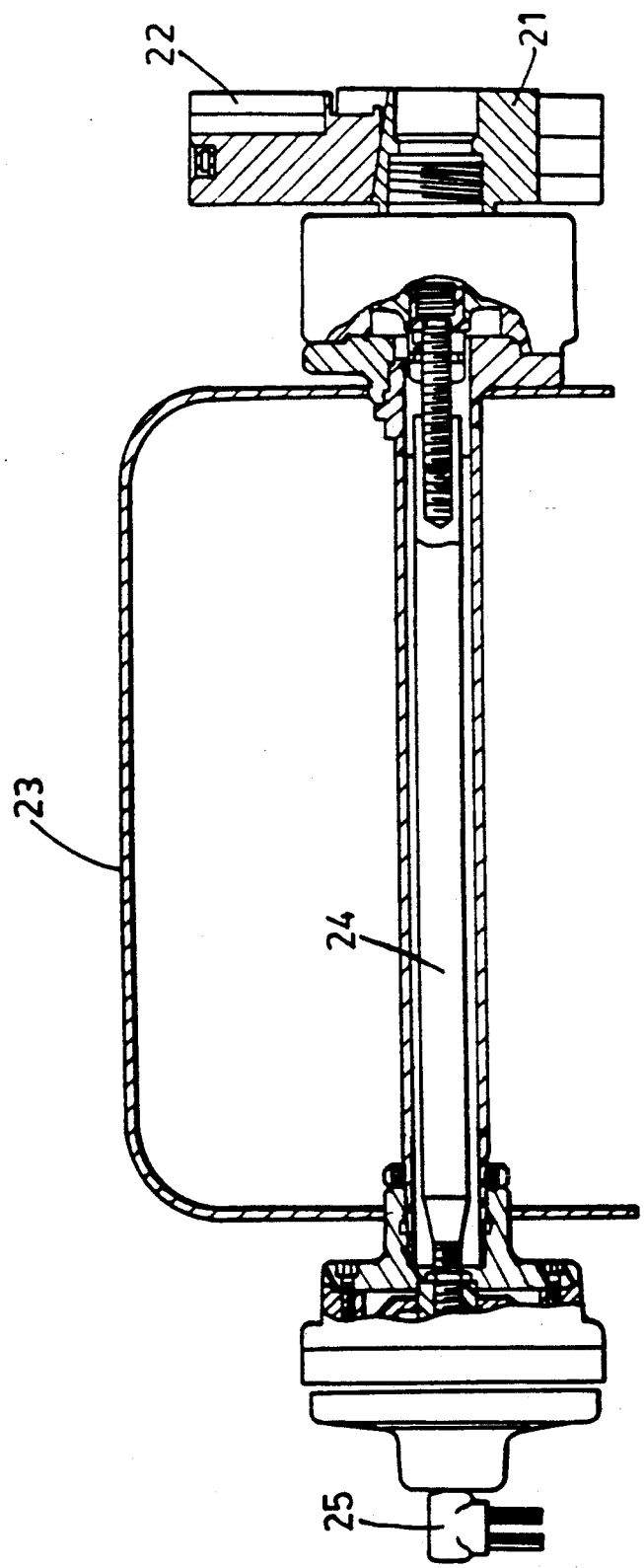
FIG. 3 is an illustration of the conventional hydraulic chuck assembly when mounted on a CNC lathe.
Figure 5A:
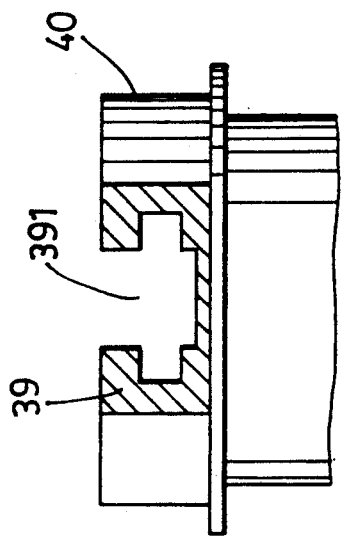
FIG. 5A is an enlarged view showing a seat retaining slide groove of a main chuck body of the first preferred embodiment.
Figure 5:
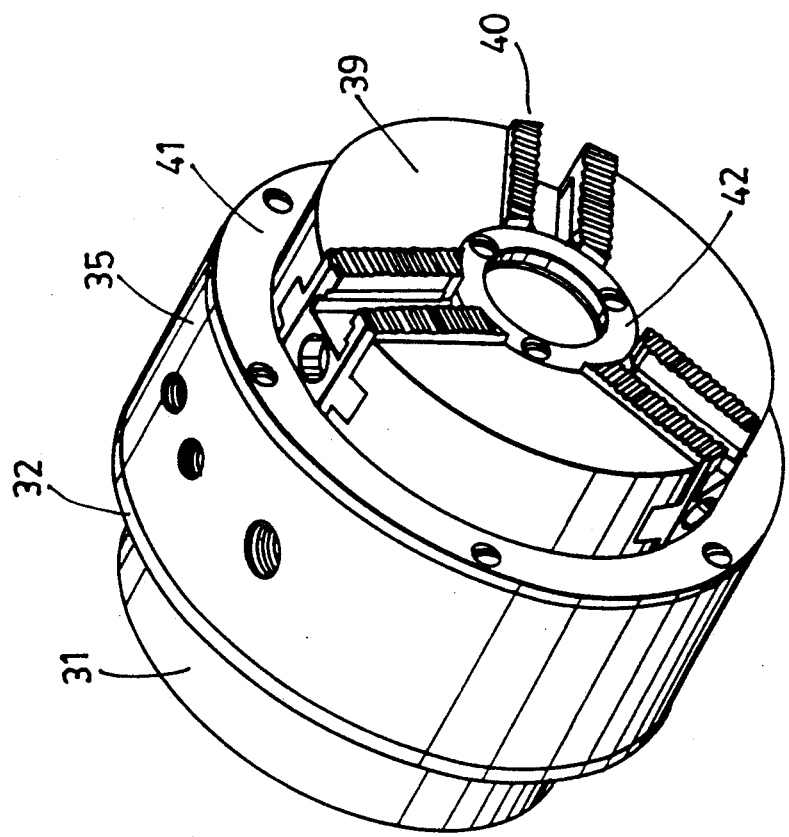
FIG. 5 is a perspective view illustrating the assembly of the first preferred embodiment.
Figure 6:
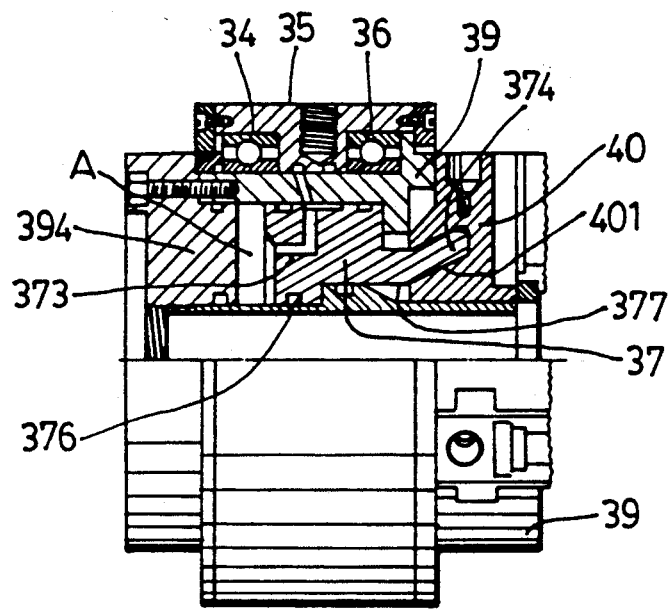
FIG. 6 is a partially sectional view illustrating the first preferred embodiment when in a grip tightening position.
Figure 7:
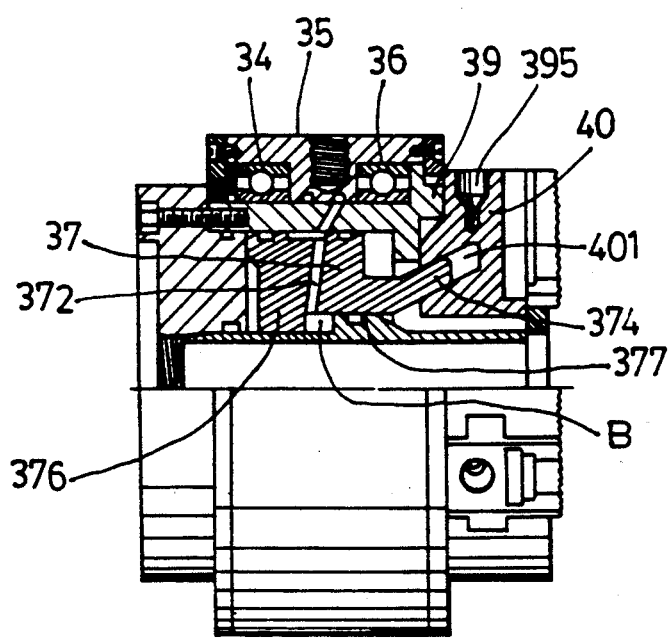
FIG. 7 is a partially sectional view illustrating the first preferred embodiment when in a grip loosening position.

Referring to FIG. 4, the first preferred embodiment of a hydraulic chuck asembly according to the present invention is shown to comprise a base (31), a rear press ring (32), a rear cover ring (33), a pair of roller bearing means (34, 36), an annular casing (35), a tubular plunger (37), a tubular shaft sleeve (38), a main chuck body (39), three grip seats (40), a front press ring (41) and a protective ring (42). Assembly of the various components of the first preferred embodiment is shown in FIGS. 5, 6 and 7.

The rear cover ring (33) is provided around a cylindrical projection (310) of the base (31). The base (31) is further provided with a threaded axial bore (311). The annular casing (35) is formed with an inward annular projection (350). The press rings (32, 41) are respectively provided on the rear and front ends of the annular casing (35). The roller bearing means (34, 36) are mounted to the inner surface of the annular casing (35) and are disposed on two sides of the annular projection (350).

The shaft sleeve (38) has a threaded end (380) which engages the base (31) at the axial bore (311). The intermediate portion of the shaft sleeve (38) is further provided with an outward annular flange (381). The shaft sleeve (38) is to be sleeved on an actuating shaft (not shown) of a CNC lathe (not shown).

The base (31) is provided on the rear end of the main chuck body (39). The main chuck body (39) is a hollow member that defines a fluid working chamber. The main chuck body (39) extends into the annular casing (35) and is supported therein by the roller bearing means (34, 36).

The roller bearing means (34, 36) permit rotation of the main chuck body (39) relative to the annular casing (35). The main chuck body (39) is formed with a radial guide hole (392) which receives a guide pin (393). Radial fluid holes (394, 395) are formed on two sides of the guide hole (392). The main chuck body (39) is further provided with a front head that is anterior to the fluid working chamber and is formed with three radially extending and angularly spaced seat retaining slide grooves (391). The configuration of the slide grooves (391) can be seen in FIG. 5A. The slide grooves (391) slidably receive the grip seats (40). The protective piece (42) is provided on the front head of the main chuck body (39) to prevent the shaft sleeve (38) from extending out of the same.

Each of the grip seats (40) is to be provided with a grip member (not shown). Referring to FIG. 4A, the rear side of the grip seat (40) is formed with a pair of spaced slide projections (402, 403) which cooperatively define an inclining curved groove (401). The plunger (37) is movably provided inside the main plunger (37) has a rear end portion (370) which is in sliding and in sealing contact with the inner surface of the main chuck body (39). The inner periphery of the rear end portion (370) has a first section with a smaller diameter (376) and a second section (377) with a larger diameter. The first section (376) is in sliding and in sealing contact with the shaft sleeve (38). The flange (381) of the shaft sleeve (38) is similarly in sliding and in sealing contact with the second section (377). The rear end portion (370) is further provided with an axially extending guide slot (371). The guide pin (393) extends into the guide slot (371) and permits frontward or rearward sliding movement of the plunger (37) relative to the main chuck body (39). Fluid bores (372, 373) are formed on two sides of the guide slot (371). The fluid bore (372) is transverse to the axis of the plunger (37) and has an outlet (3721) which is communicated with a volume variable annular chamber (B) of the fluid working chamber. The annular chamber (B) is defined by the first and second sections (376, 377), the flange (381) and a portion of the shaft sleeve (38) adjacent to the flange (38). The fluid bore (373) has an axially extending outlet end (3731) which is communicated with a volume variable annular chamber (A). The annular chamber (A) is provided between the rear end portion (370) of the plunger (37) and the base (31). The plunger (37) is further provided with a gradually expanding and forwardly extending funnel-shaped cam portion (374) which extends out of the fluid working chamber and into the front head of the main chuck body (39). The curved grooves (401) of the grip seats (40) cooperatively receive the funnel-shaped cam portion (374).

The annular projection (350) of the annular casing (35) is formed with a pair of annular fluid grooves (351, 352). The annular casing (35) further has a pair of fluid holes (3511, 3512), each of which is communicated with a respective one of the fluid grooves (351, 352). The fluid grooves (351, 352) are to be communicated with a respective one of the fluid holes (394, 395) of the main chuck body (39). This permits circulation of hydraulic fluid even after the main chuck body (39) has been rotated for a certain angle relative to the annular casing (35). The annular casing (35) is further provided with a fluid return hole (353) disposed on one side of the fluid holes (3511, 3512).

Figure 8:
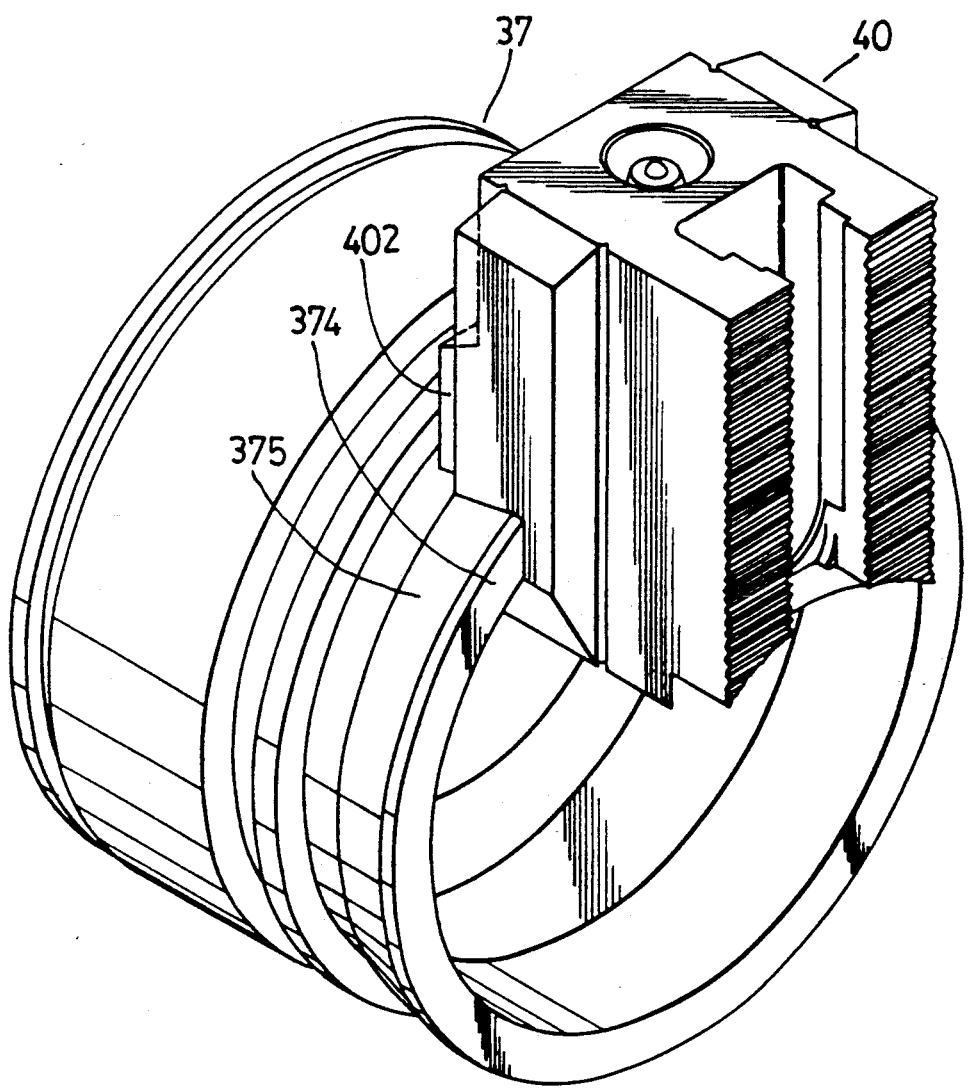
FIG. 8 is a perspective view illustrating the grip seat when in the grip loosening position.

Referring once more to FIGS. 4 and 6, hydraulic fluid entering the fluid hole (3511) of the annular casing (35) flows through the fluid groove (351), through the fluid hole (394) of the main chuck body (39), and through the fluid bore (373) of the plunger (37) and enters the volume variable annular chamber (A) to move the plunger (37) forward so that the cam portion (374) of the plunger (37) can extend into the curved grooves (401) of the grip seats (40). At this time, the grip seats (40) are supported on a narrower portion (375) of the cam portion (374), thus urging the grip seats (40) to move radially inward along the respective slide groove (391) (Refer to FIG. 8). This allows the grip members (not shown) which are provided on the grip seats (40) to hold a tool tightly.

Figure 9:
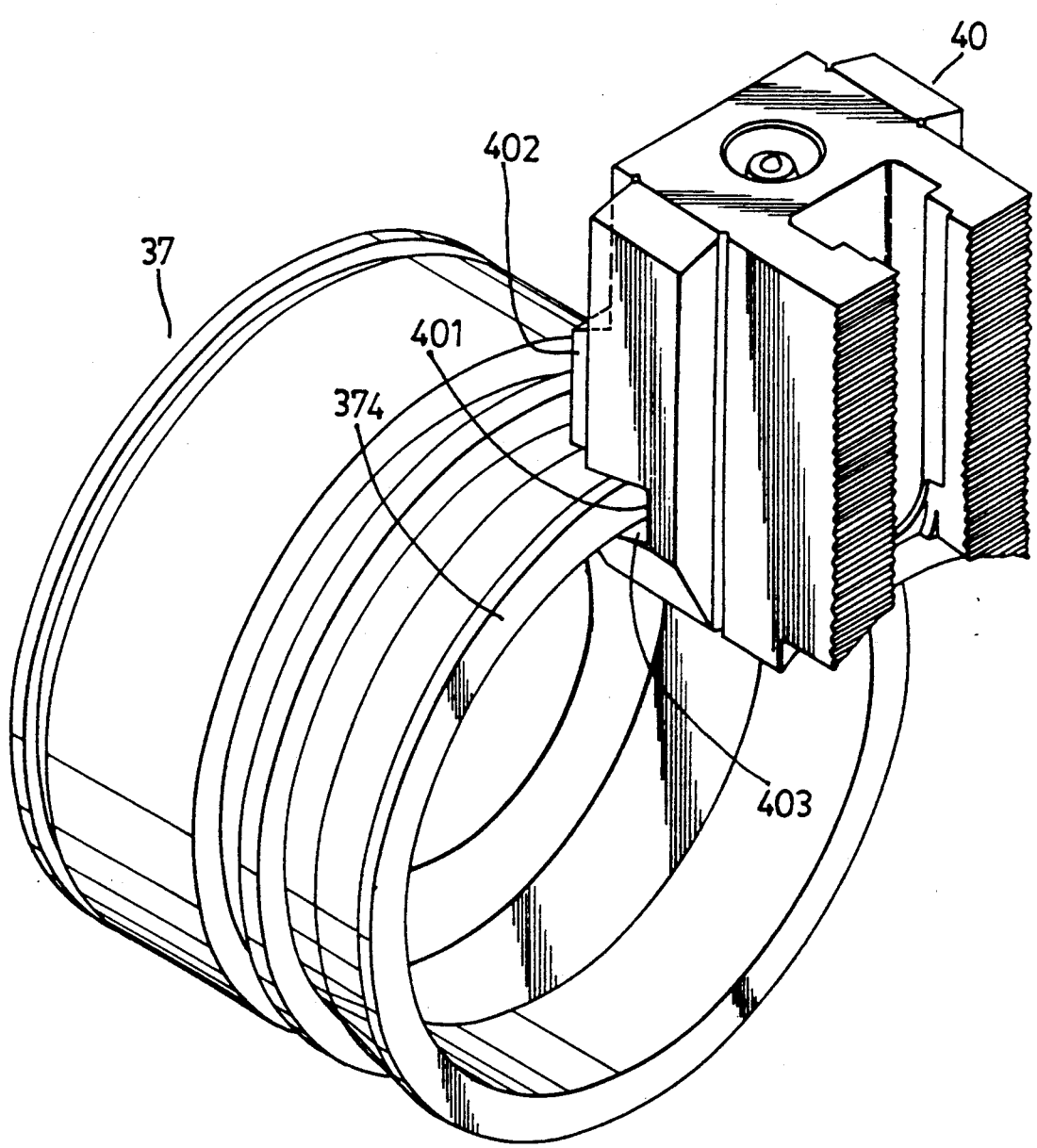
FIG. 9 is a perspective view illustrating the grip seat when in the grip tightening position.

Referring now to FIGS. 4 and 7, hydraulic fluid entering the fluid hole (3521) of the annular casing (35) flows through the fluid groove (352), the fluid hole (395) of the main chuck body (39), and the fluid bore (372) of the plunger (37) and enters the volume variable annular chamber (B) to move the plunger (37) rearward so that the cam portion (374) of the plunger (37) is withdrawn from the curved grooves (401) of the grip seats (40). At this time, the grip seats (40) are supported on a wider portion of the cam portion (374), thus urging the grip seats (40) to move radially outward along the respective slide groove (391) (Refer to FIG. 9). The hydraulic chuck assembly is therefore in a loosened state to permit the detachment of a tool from the grip members.

It is preferred that the inclination of the cam portion (374) can permit radial movement of the grip seats (40) for a range of 0 to 38 mm. This permits the hydraulic chuck assembly of the present invention to hold a wide variety of tools of different specifications tightly.

Figure 10:
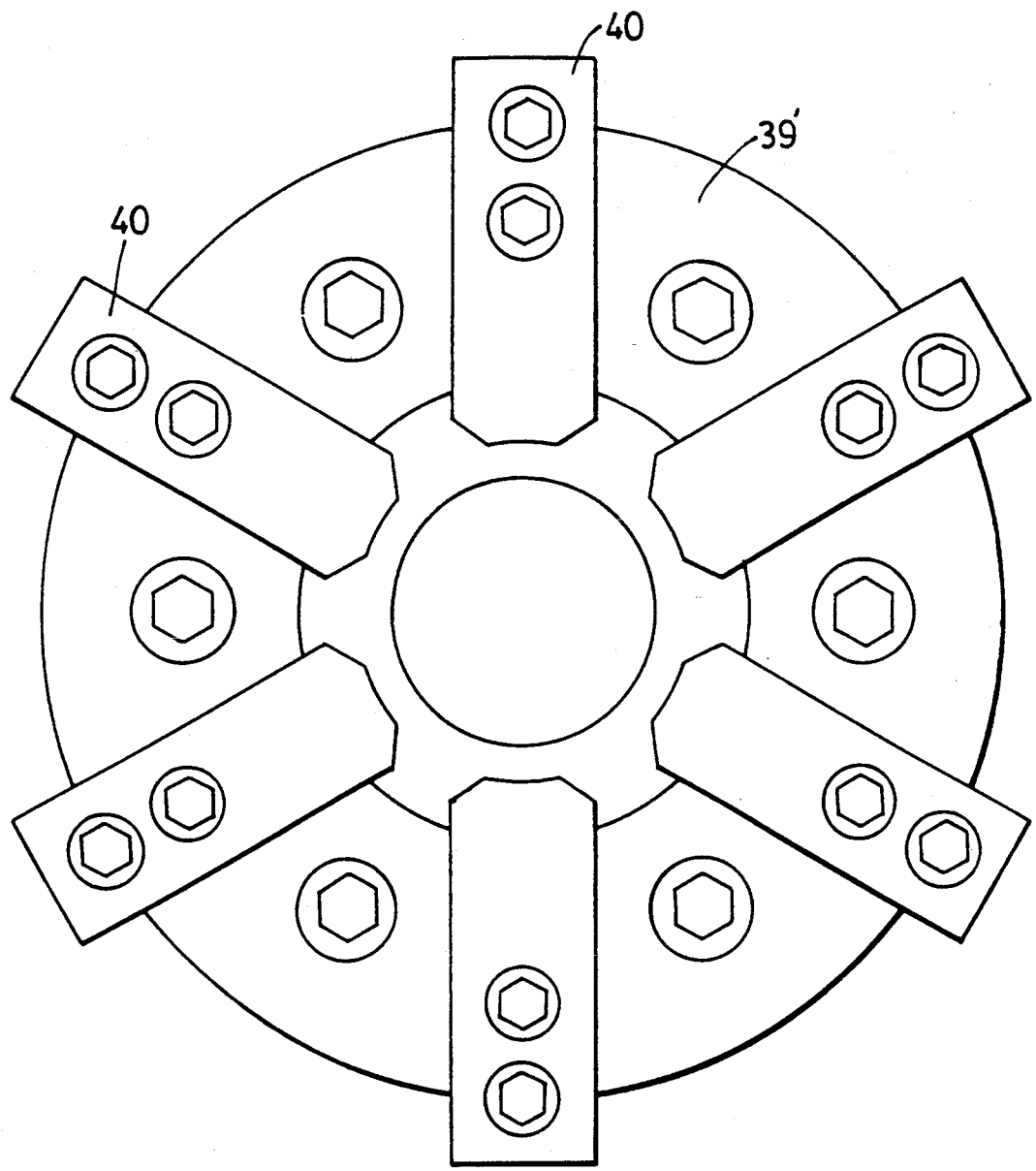
FIG. 10 is an illustration of the second preferred embodiment of a hydraulic chuck assembly according to the present invention.

The second preferred embodiment of a hydraulic chuck assembly according to the present invention is shown in FIG. 10 to comprise a main chuck body (39') having six grip retaining slide grooves to receive six grip seats (40). The six grip seats (40) are spaced at equal angles on the front head of the main chuck body (39') so that there are three pairs of aligned grip seats (40). The operation of the second preferred embodiment is substantially similar to that of the first preferred embodiment and will not be detailed further.

It has thus been shown that the number of grip seats (40) on the main chuck body can be varied so as to provide a more stable and stronger gripping effect.

Figure 11:
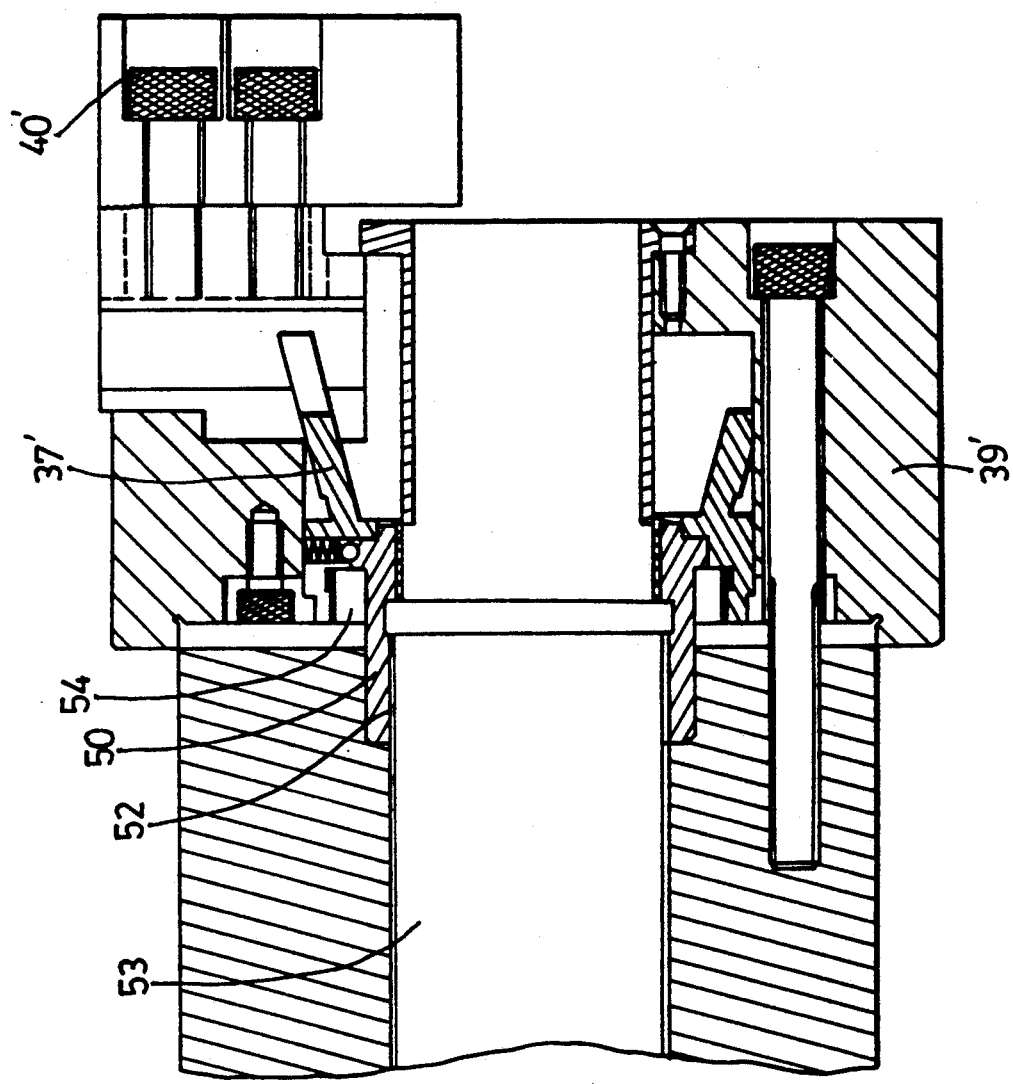
FIG. 11 is an illustration of the third preferred embodiment of a hydraulic chuck assembly according to the present invention.

A sectional view of the third preferred embodiment of a hydraulic chuck assembly according to the present invention is shown in FIG. 11. The third preferred embodiment basically comprises a hollow main chuck body (39'), a tubular plunger (37') movably provided inside the main chuck body (39') and a plurality of grip seats (40') (only one is shown) slidably retained in a respective one of the slide grooves on the front head of the main chuck body (39'). The constructions of the main chuck body (39'), the plunger (37') and the grip seats (40') are substantially similar to those shown in FIG. 4 and will not be detailed further. The main chuck body (39') and the plunger (37'), however, are not provided with fluid holes and fluid bores like those in the first and second preferred embodiments. The plunger (37') has a rear end portion connected to one end of a tubular shaft connector (50) via a mounting ring (54). The other end of the shaft connector (50) is provided with internal threads (52) to engage one end of a rotary actuating shaft (53) of the CNC lathe. This illustrates how the plunger (37') is connected to the shaft (53).

The CNC lathe is provided with a hydraulic fluid system (not shown) to move the shaft (53) axially forward or rearward, thus correspondingly moving the plunger (37') forward or rearward. The grip seats (40') can thus be moved toward or away from each other along the respective slide groove on the main chuck body (39').

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A hydraulic chuck assembly to be provided on one end of a shaft of a lathe, comprising:
   a hollow main chuck body defining a fluid working chamber, said main chuck body having a rear closed end and a front head anterior to said fluid working chamber and being formed with a plurality of radially extending and angularly spaced seat retaining slide grooves;
   a tubular shaft sleeve to be sleeved on said shaft of said lathe, said shaft sleeve extending into said main chuck body and passing through said fluid working chamber;
   a tubular plunger movably provided inside said fluid working chamber and around said shaft sleeve, said plunger having a rear end portion and a gradually expanding and forwardly extending funnel-shaped cam portion extending out of said fluid working chamber and into said front head;
   a plurality of grip seats each being slidably retained in a respective one of said slide grooves, each of said grip seats having a rear side formed with an inclining groove, said inclining grooves of said grip seats cooperatively receiving said funnel-shaped cam portion; and
   a hydraulic driving means associated with said main chuck body and operating inside said fluid working chamber so as to move said plunger forward or rearward, said funnel-shaped cam portion camming said inclining grooves of said grip seats so as to move said grip seats toward or away from each other along said slide grooves.

2. The hydraulic chuck assembly as claimed in claim 1, wherein:
   said shaft sleeve having an intermediate portion provided with an annular outward flange;
   said rear end portion of said plunger having an outer periphery which is in sliding and in sealing contact with an inner surface of said main chuck body and further having an inner periphery which has a first section with a smaller diameter and a second section with a larger diameter, said first section being in sliding and in sealing contact with said shaft sleeve, said second section being in sliding and in sealing contact with said annular outward flange;
   said fluid working chamber including a first volume variable annular chamber between said rear end portion of said plunger and said rear closed end of said main chuck body, and a second volume variable annular chamber defined by said first and said second sections of said inner periphery of said rear end portion of said plunger, said annular outward flange and a portion of said shaft sleeve adjacent to said annular outward flange.

3. The hydraulic chuck assembly as claimed in claim 2, further comprising an annular casing receiving said main chuck body and a roller bearing means supporting said main chuck body inside said casing.

4. A hydraulic chuck assembly to be provided on one end of a shaft of a lathe, comprising:
   a hollow main chuck body having a front head being formed with a plurality of radially extending and angularly spaced seat retaining slide grooves;
   a tubular plunger movably provided inside said main chuck body, said plunger having a rear end portion and a gradually expanding and forwardly extending funnel-shaped cam portion extending into said front head; and
   a plurality of grip seats each being slidably retained in a respective one of said slide grooves, each of said grip seats having a rear side formed with an inclining groove, said inclined grooves of said grip seats cooperatively receiving said funnel-shaped cam portion, said plunger being movable forward or rearward, and said funnel-shaped cam portion camming said inclining grooves of said grip seats so as to move said grip seats toward or away from each other along said slide grooves.

* * * * *